United States Patent [19]
Beall et al.

[11] Patent Number: 5,974,676
[45] Date of Patent: Nov. 2, 1999

[54] LOW PROFILE PLUMB BOB ASSEMBLY

[75] Inventors: Jerrold R. Beall, Newark, Ohio; John S. McGuire, Ottawa, Canada

[73] Assignee: Lee Valley Tools Ltd., Ottawa, Canada

[21] Appl. No.: 08/854,980

[22] Filed: May 13, 1997

[51] Int. Cl.$^6$ .................................................. G01C 15/10
[52] U.S. Cl. .............................................. 33/392; 33/398
[58] Field of Search ............................. 33/392, 391, 398, 33/402, 393, 394

[56] References Cited

U.S. PATENT DOCUMENTS

| | | | |
|---|---|---|---|
| 266,671 | 10/1882 | Bergen | 33/393 |
| D. 336,049 | 6/1993 | Patridge et al. | D10/69 |
| D. 359,245 | 6/1995 | Lee et al. | D10/65 |
| 787,896 | 4/1905 | Converse | 33/392 |
| 1,060,855 | 5/1913 | Pipher | 33/393 |
| 1,538,746 | 5/1925 | Reneau | 33/393 |
| 1,577,133 | 3/1926 | Learnihan | 33/393 |
| 2,135,211 | 11/1938 | Johnson | 33/393 |
| 2,422,358 | 6/1947 | Lobl | 33/393 |
| 2,791,037 | 5/1957 | Damron | 33/392 |
| 2,803,067 | 8/1957 | Kurschner | 33/392 |
| 5,426,860 | 6/1995 | Lee et al. | 33/392 |
| 5,469,633 | 11/1995 | St. Peter | 33/394 |

FOREIGN PATENT DOCUMENTS

| | | | |
|---|---|---|---|
| 689069 | 9/1930 | France | 33/393 |
| 268892 | 1/1951 | Switzerland . | |
| 783813 | 10/1957 | United Kingdom | 33/392 |

OTHER PUBLICATIONS

Photograph of plumb bobs from The 1994 *American Woodworker* Calendar, ©1993.

*Primary Examiner*—Christopher W. Fulton
*Attorney, Agent, or Firm*—John S. Pratt; Kilpatrick Stockton LLP

[57] ABSTRACT

A plumb bob assembly including a plumb bob for use adjacent to a wall or other vertical surface, a cord, cord spool attachable to the plumb bob for storage and a tip cover. A pencil may be inserted through a vertical slot in the plumb bob body to mark the position of the plumb bob relative to an adjacent wall. The plumb bob has a relatively flat, tear-drop shaped plastic body, to which two disk-shaped brass weights, a brass cord attachment ball and a conical brass tip are attached. A plastic spool has a cord receiving region defined by two walls and a plate that protrudes beyond one of the walls. Opposed hooks on the plate provide a means for tying-off the cord and hanging the plumb bob assembly from a nail during use. A collar on the plate locks the spool on the plumb bob during storage by inserting the plate into the slot in the plumb bob body.

15 Claims, 2 Drawing Sheets

LOW PROFILE PLUMB BOB ASSEMBLY

FIELD OF THE INVENTION

The present invention is a plumb bob and related components.

BACKGROUND OF THE INVENTION

Plumb bobs are ancient tools used in the building trades and other activities to locate a point in space directly below or directly above another point in space. Conventional plumb bobs are typically brass, steel or combinations of metals, with a pointer or tip on one end and an arrangement for attachment of a string or cord to the other end. The plumb bob is suspended from the cord, and after all motion stops, the tip of the pointer is located directly below the point in space to which the remote end of the cord is attached and from which the plumb bob is suspended.

Conventional plumb bobs are typically symmetrical about a longitudinal axis on which the plumb bob tip and cord attachment point are both located, often having a round, hexagonal or octagonal shape. Conventional plumb bobs generally have a bulbous portion that is often relatively close to the cord attachment point. Such bulbous portions are included in order to ensure that the plumb bob has relatively substantial mass despite a modest length. Modest length is desirable so that unwanted pendular, swinging, or wobbling motion of the plumb bob from the cord-to-plumb bob attachment point dies out quickly. Substantial mass is desirable for accuracy.

Plumb bobs are often used in locations well separated from other structures. However, among the most frequent uses of plumb bobs are ones immediately adjacent to a wall or other vertical structure, where the plumb bob is used to locate a point on a floor or baseboard immediately below another point higher on or at the top of the wall. In other instances they are used when such a higher point needs to be located immediately above an established point on the floor or baseboard.

Both round and polygon cross-section plumb bobs roll around against the wall or baseboard in such applications, making it very difficult to establish an accurate position and sorely trying the user's patience. Even when such round or polygon plumb bobs stabilize, the plumb bob tip is no closer than half the bob's diameter away from the adjacent wall, making it very difficult to project the position of the tip onto the wall accurately. Furthermore, the bulbous body of most plumb bobs makes it impossible even to see the plumb bob tip from the user's typical position generally above the suspended bob.

Two other recurring problems are associated with conventional plumb bobs. First, their cords frequently become tangled when the plumb bob is not in use, particularly if stored in a typical tool box, and the cord frequently acquires permanent knots and loops intended to be only temporary for hanging the bob during use from a nail or other object. Second, sharp plumb bob tips are desirable for accuracy but are frequently damaged during intervals of tool box storage and occasionally impale the hand of a tool box visitor.

SUMMARY OF THE INVENTION

The present invention includes a plumb bob that is bulbous in one dimension or plane orthogonal to its longitudinal axis but relatively thin or "flat" in a second dimension or plane orthogonal to both the first dimension and the longitudinal axis. A cord attaches at one end of the bob, and a sharp tip is located at the other. Intermediate the cord attachment point and the tip is a slot aligned with and on the bob's longitudinal axis. A pencil may be inserted through this slot to mark the plumb bob's position on a wall or other vertical structure next to which it is used. A spool for the cord may be snapped into the slot in order to neatly store the cord when the plumb bob is not in use. Opposed hooks on the spool tie off the remote cord end during use and provide a suspension point by locating one of the hooks over a nail.

A generally disc-shaped weight near the bob's tip provides mass and a stabilizing "flat" surface that can contact a wall or other vertical structure when the plumb bob is used adjacent to the structure. Pressure can be applied, as for instance with a finger, to the other side of the disc in order to facilitate marking the plumb bob's position without changing that position. The "flat" plumb bob profile also positions the tip near the wall, reducing parallax error, and permits the tip to be seen easily from above. A snap on plastic cover protects the sharp tip.

It is thus an object of the present invention to provide a relatively "flat" plumb bob that will quickly stabilize, and may be easily used, adjacent to a wall.

It is a further object of the present invention to provide a plumb bob with a tip that can be easily seen from a position generally above the bob and the location of which tip can be transferred to an adjacent wall or other vertical structure with minimal parallax error.

It is another object of the present invention to provide a plumb bob with a slot on the bob's vertical axis that can be used to mark the bob's position when it is used adjacent to a wall. It is a further object of the present invention to provide a plumb bob having a tip protector that may be used to protect the plumb bob tip when it is not in use and may even be left in place during use of the plumb bob.

It is a further object of the present invention to provide a plumb bob assembly with provision for storing the cord in a manner that it will not become tangled during storage of the plumb bob.

It is yet another object of the present invention to provide a convenient-to-use cord termination apparatus that can easily be hung over a nail driven into a vertical surface for use of the bob adjacent to that surface.

It is another object of the present invention to provide a plumb bob that, when used adjacent to a wall or other vertical surface, will quickly stabilize and not roll against the wall before coming to rest.

DETAILED DESCRIPTION OF THE DRAWINGS

Figure 1:
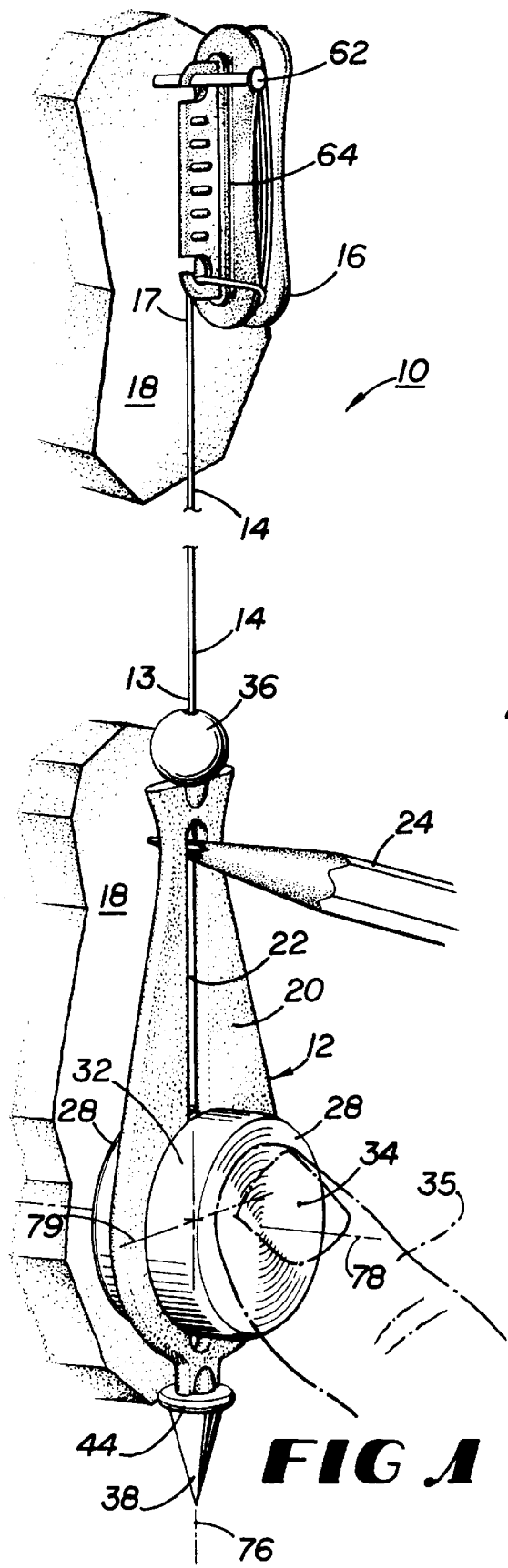
FIG. 1 is a perspective view showing the front and left side of the plumb bob assembly of the present invention in use against a wall.

A plumb bob assembly 10 of the present invention is shown in FIG. 1 in use against a wall 18. The plumb bob assembly generally includes a plumb bob 12 attached to one end 13 of a cord 14 and a spool 16 attached to the other cord end 17.

Figure 2:
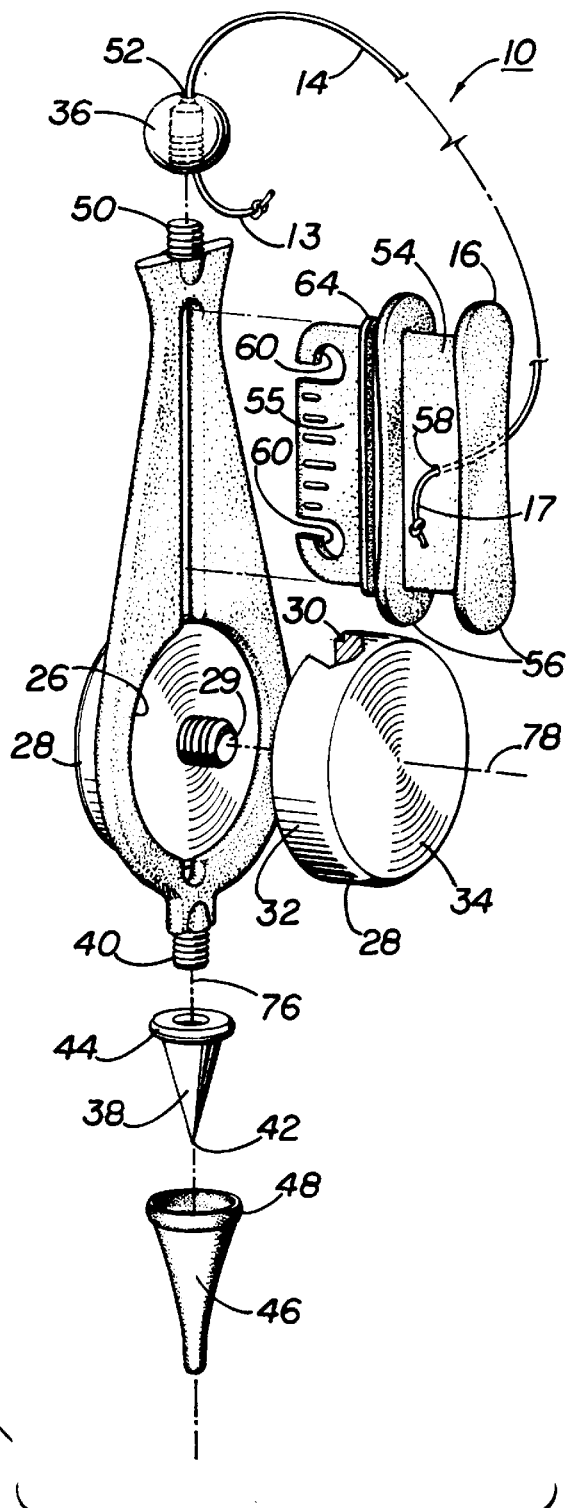
FIG. 2 is an exploded perspective view of the plumb bob assembly shown in FIG. 1.
Figure 3:
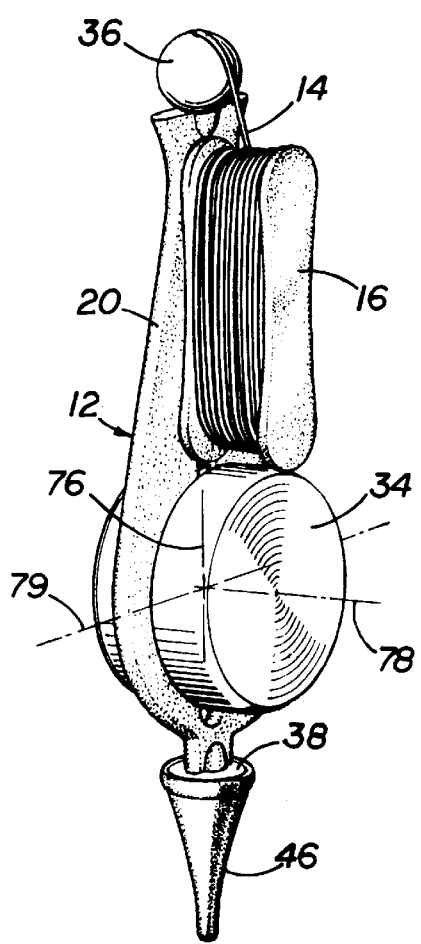
FIG. 3 is a perspective view of the components shown in FIG. 1 assembled for storage.

As can be seen by reference to FIGS. 1 and 2 in the first embodiment of the present invention, the plumb bob 12 has a generally tear-drop shaped planar or "flat" bob body 20 that is penetrated by an axial slot 22. A pencil 24 or other marking instrument may be inserted through slot 22 in order to mark the bob's position on a wall 18 as is illustrated in FIG. 1. Slot 22 dies into a round opening 26 in bob body 20. Positioned within opening 26 and on opposite sides of body 20 are two discs 28 which, in the preferred embodiment, are brass, but that might be fabricated of another metal or other relatively dense material in order to provide mass. Disks 28 are joined by a threaded rod 29 received in a threaded hole centered in one face of each disk 28.

Each disc 28 is slightly larger in diameter than hole 26 but has an annular depression or groove 30 on one side that engages body 20 at opening 26, thereby centering the assembly of two disks 28 and rod 29 within opening 26 in body 20. The thickness of each disc 28 is sufficient to ensure that its exposed side 34 will lie in a vertical plane positioned away from bob 12 more than attachment ball 36 or tip 38, so that one of the disc 28 walls 34 will lie against a wall 18 or other vertical structure when plumb bob assembly 10 is used immediately adjacent to such wall 18 or other structure and ball 36 and tip 38 will not touch the wall. As may be seen by referenced FIG. 1, during use of plumb bob assembly 10, the user can easily lock the bob 12 in position on wall 18 by pressing against the exposed disc side 34 with a well manicured finger 35 to stabilize the position of bob 12 for marking with a pencil 24.

Figure 5:
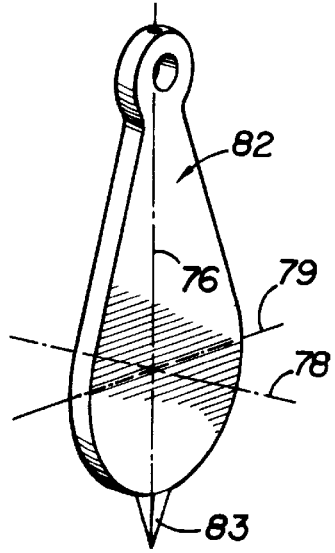
FIG. 5 is a perspective view of an alternative embodiment of the plumb bob of the present invention.

Plumb bob body 20 has a post 40 that protrudes from the bottom of bob 20 on its longitudinal axis. Post 40 receives tip 38 that may be manufactured of brass or other metals or other durable materials or that, alternatively, may be molded or otherwise fabricated as an integral part of body 20. In the preferred embodiment of the present invention, tip 38 is in the form of a cone terminating in a point 42 at the bottom of bob 12 and having an angular ring or bead 44 at the top of tip 38. Tip 38 could also be a pyramid, 83 as shown in FIG. 5, or another convenient shape terminating in an edge or a point. A tip cover 46 may be fabricated of plastic or other suitable material sized to fit over tip 38. A collar 48 of cover 46 can snap over and fit snugly around bead 44 on tip 38 to hold cover 46 in place.

The upper end of body 20 terminates in a threaded stub 50 that is coaxial with the longitudinal axis 76 of plumb bob 12. Crown ball 36 is internally threaded, and it is penetrated by a bore 52. Cord end 13 passes through bore 52 and is knotted. Crown ball 36 is then threaded onto stud 50, thereby providing a means for attaching cord 14 to plumb bob 12. Cord spool 16, which may be fabricated of molded plastic or a wide variety of other suitable materials, is basically a plate 54 having two spool collars or walls 56 that define a portion of the plate 54 around which cord 14 may be wound. The end 17 of cord 14 may pass through a hole 58 in plate 54 located between spool walls 56.

Figure 4A:
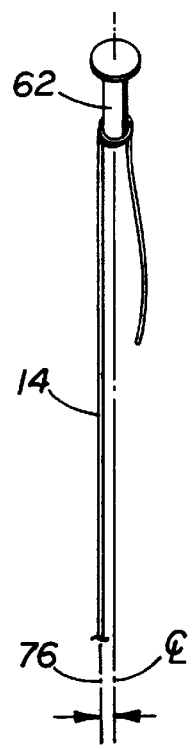
FIG. 4A is a side elevation view of one of the cord suspension methods of the prior art.
Figure 4:
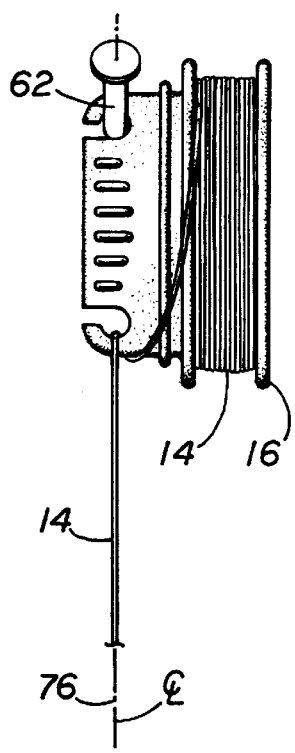
FIG. 4 is a side elevation view of the cord suspension structure of the present invention showing alignment of the cord with the center of the nail from which the plumb bob is suspended.

A portion 55 of plate 54 protrudes beyond one of the spool walls 56 to serve two functions. First, corners of plate 54 portion 55 define opposed hooks 60. After a desired length of cord 14 has been removed from spool 16, the cord 14 is looped through one of the hooks 60. The other hook 60 can then be hung on a nail 62 as is illustrated in FIGS. 1 and 4. As may be easily understood by reference to FIGS. 4A and 4, use of this feature of spool 16 helps to avoid errors that result when, as shown in FIG. 4A, the cord hangs from the side on nail 62 rather than the center of nail 62, as shown in FIG. 4 when spool 16 is used. The second function relates to storage of the plumb bob assembly 10. When not in use, all of cord 14 may be wound around spool 16, and the protruding portion 55 of spool plate 54 may be inserted through slot 22 in body 20 until a small ridge or collar 64 on portion 55 has passed through slot 20, thereby serving to lock the spool 16 and bob 12 together for storage.

The low profile plumb bob assembly of the present invention is not confined to the embodiments described herein but includes variations and modifications within the scope and spirit of the foregoing description, the accompanying drawings and the following claims.

Figure 6:
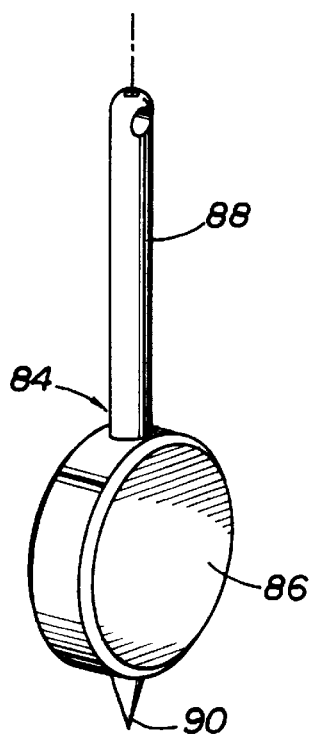
FIG. 6 is a perspective view of a second alternative embodiment of the plumb bob of the present invention.
Figure 7:
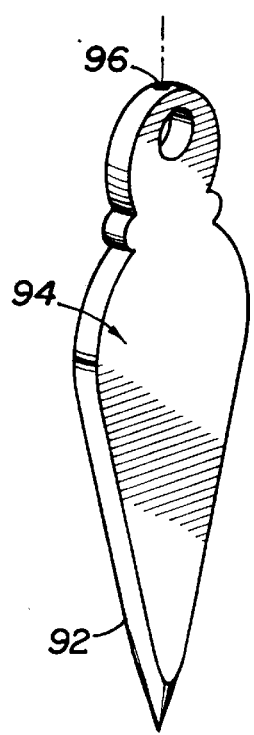
FIG. 7 is a perspective view of a third alternative embodiment of the plumb bob of the present invention.

For instance, the plumb bob may be fabricated in the alternative forms shown in FIGS. 5, 6 and 7, among numerous other forms that will be understood by those skilled in the art. The plumb bob 82 shown in FIG. 5 is formed of a single piece of material and has an inverted pyramid-shaped tip 83. The plumb bob 84 shown in FIG. 6 comprises a disk 86 to which a rod 88 and a tip 90 are attached. Finally, the plumb bob 92 shown in FIG. 7 has a shape that mimics a cross section of a conventional bob having a bulbous portion 94 near the cord attachment point 96.

We claim:

1. A plumb bob, comprising an elongated body lying in first, second and third mutually orthogonal planes, the body having two opposed ends and a pointed tip at one end and a point for attachment of a cord at the other end, both of which attachment point and tip lie in the first and second planes, the body having a tear-drop shape in the first plane and a generally flat profile viewed normal to the second plane.

2. A plumb bob, comprising a generally flat, tear-drop shaped body having a pointed tip at one end and a cord attachment point at the other end.

3. A plumb bob, comprising a generally flat body having two opposed ends and one only bulbous portion between the two ends, a pointed tip on one end of the body, and a cord attachment location on the other end.

4. The plumb bob of claim 3, wherein the bulbous portion is located near the cord attachment location.

5. A plumb bob, comprising a generally flat body having two opposed ends and a bulbous portion between the two ends, a pointed tip on one end of the body, and a cord attachment location on the other end, wherein the bulbous portion comprises at least one metal disk located near the tip.

6. A plumb bob, comprising a generally flat body having two opposed ends and a bulbous portion between the two ends, a pointed tip on one end of the body, a cord attachment location and a cord attachment ball on the other end and a weight attached to the body, wherein the body is plastic, the tip, ball and weight are metal, and the weight comprises two disks secured to each other by a post that passes through a hole in the body.

7. A plumb bob, comprising a generally flat body having two opposed ends and a bulbous portion between the two ends, a pointed tip on one end of the body, and a cord attachment location on the other end, wherein the body is penetrated by a slot on the longitudinal axis through which a marking instrument may be inserted for marking the position of the plumb bob relative to a vertical surface.

8. A plumb bob, comprising a generally flat, tear-drop shaped body having a top and a bottom, a conical tip attached to the bottom of the body, a cord attachment ball attached to the top of the body and a weight attached to the body near the tip.

9. A plumb bob assembly, comprising:

a plumb bob comprising a generally flat, tear-drop shaped body having a conical tip attached to one end of the body, a cord attachment ball attached to the other end of the body and a weight attached to the body near the tip, and a spool, and a cord having two ends, one of which is attached to the plumb bob and the other of which is attached to the spool.

10. The plumb bob assembly of claim 9, wherein the spool has two hooks, one of which may be hung on a suspension member while the cord is looped through the other, thereby providing a desired length of cord between the plumb bob and the spool.

11. The plumb bob assembly of claim 10, wherein the spool comprises a generally rectangular plate and two spaced-apart walls attached to the plate to define a portion of the plate between the walls around which the cord may be wrapped and a plate portion outside the walls, the plate having one hook formed on each of the two adjacent corners of the plate portion outside the walls.

12. The plumb bob assembly of claim 11, wherein a collar is formed on the portion of the plate outside the walls, and the plate and collar may be pushed through the slot to store the spool attached to the plumb bob when not in use.

13. The plumb bob assembly of claim 9, further comprising a conical plastic cup that may be positioned over the tip to protect the tip from damage.

14. The plumb bob assembly of claim 9, wherein the tip is a generally cone-shaped brass component having a threaded hole to receive a threaded post on the body and the attachment ball is a brass sphere penetrated by a hole, a portion of which is enlarged and threaded to receive a threaded stud on the body.

15. A plumb bob assembly, comprising:

a plumb bob comprising a generally flat, tear-drop shaped body having top and bottom ends, each of which end terminates in a threaded post, wherein the body is penetrated by a longitudinal slot through which a marking instrument may be inserted for marking the position of the plumb bob relative to a vertical surface, a generally conical tip attached to one of the posts, a cord attachment ball attached to the other of the posts, a weight comprising two metal, round disks attached to each other by a stud that passes through a hole in the body, a spool comprising a generally rectangular plate and two spaced-apart walls attached to the plate to define a portion of the plate between the walls around which cord may be wrapped and a plate portion outside the walls, the plate having one hook formed on each of two adjacent corners of the plate portion outside the walls, and a cord having two ends, one of which is attached to the ball and the other of which is attached to the spool.

* * * * *

UNITED STATES PATENT AND TRADEMARK OFFICE
CERTIFICATE OF CORRECTION

PATENT NO. : 5,974,676
DATED : November 2, 1999
INVENTOR(S) : Jerrold R. Beall et al.

It is certified that error appears in the above-indentified patent and that said Letters Patent is hereby corrected as shown below:

Cover page, Inventors: delete "John S. McGuire" and insert --Michael S. McGuire--

Signed and Sealed this

Seventeenth Day of October, 2000

Attest:

Q. TODD DICKINSON

*Attesting Officer*        *Director of Patents and Trademarks*